US011222548B2

(12) United States Patent
Kim et al.

(10) Patent No.: US 11,222,548 B2
(45) Date of Patent: Jan. 11, 2022

(54) NAVIGATION PERFORMANCE IN URBAN AIR VEHICLES

(71) Applicant: The Boeing Company, Chicago, IL (US)

(72) Inventors: Geun Il Kim, Bothell, WA (US); Gang Feng, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 119 days.

(21) Appl. No.: 16/406,514

(22) Filed: May 8, 2019

(65) Prior Publication Data
US 2020/0357292 A1 Nov. 12, 2020

(51) Int. Cl.
G08G 5/04 (2006.01)
G05D 1/10 (2006.01)
G06F 17/11 (2006.01)
G08G 5/00 (2006.01)

(52) U.S. Cl.
CPC .............. *G08G 5/045* (2013.01); *G05D 1/104* (2013.01); *G06F 17/11* (2013.01); *G08G 5/0008* (2013.01); *G08G 5/0021* (2013.01)

(58) Field of Classification Search
CPC combination set(s) only.
See application file for complete search history.

(56) References Cited

U.S. PATENT DOCUMENTS

| 9,482,551 | B1* | 11/2016 | Heinrich | G01C 23/00 |
| 2003/0004642 | A1* | 1/2003 | Lin | G08G 5/0008 |
| | | | | 701/301 |
| 2007/0222665 | A1* | 9/2007 | Koeneman | G08G 5/0021 |
| | | | | 342/29 |
| 2009/0112539 | A1 | 4/2009 | Halvorson et al. | |
| 2010/0094487 | A1 | 4/2010 | Brinkman | |
| 2010/0152932 | A1 | 6/2010 | Das | |
| 2010/0152996 | A1* | 6/2010 | Blanchon | G08G 5/0052 |
| | | | | 701/120 |

(Continued)

OTHER PUBLICATIONS

Federal Aviation Administration (FAA), Assessing the validity of using actual navigation performance (ANP) information for supporting designated flight inspection operations, Dec. 2008 (Year: 2008).*

(Continued)

*Primary Examiner* — Jeff A Burke
*Assistant Examiner* — Zachary Joseph Wallace
(74) *Attorney, Agent, or Firm* — Sage Patent Group

(57) ABSTRACT

A method performed by an air vehicle having navigational equipment includes receiving an actual navigation performance (ANP) value from a neighboring air vehicle. The method also includes displaying a representation of the air vehicle and a representation of the neighboring air vehicle on a display. The method also includes determining a combined ANP (CANP) value based on the ANP value from the neighboring air vehicle and an ANP value of the air vehicle. The method also includes comparing a position of the air vehicle to the CANP value. The method also includes responsive to the position of the air vehicle being within a distance margin away from the neighboring air vehicle based on the CANP value, performing an action to increase a distance the air vehicle is from the neighboring vehicle.

20 Claims, 13 Drawing Sheets

(56) References Cited

U.S. PATENT DOCUMENTS

| | | | | |
|---|---|---|---|---|
| 2012/0123671 | A1* | 5/2012 | Oberti | G01S 13/935 |
| | | | | 701/301 |
| 2016/0083111 | A1* | 3/2016 | O'Dell | G06K 9/00624 |
| | | | | 348/144 |
| 2016/0171896 | A1* | 6/2016 | Buchmueller | G08G 5/0008 |
| | | | | 701/3 |
| 2018/0053425 | A1* | 2/2018 | Adler | G08G 5/0021 |
| 2018/0261107 | A1 | 9/2018 | Adler et al. | |
| 2019/0204449 | A1* | 7/2019 | Yuk | B64D 47/06 |
| 2020/0258405 | A1* | 8/2020 | Fern | G08G 5/0013 |

OTHER PUBLICATIONS

U.S. Department of Transportation, Federal Aviation Administration, Aeronautical Information Manual-Official Guide to Basic Flight Information and ATC Procedures, Oct. 21, 2017, pp. 225 (4-5-1)-245 (4-5-21) (Year: 2017).*

Extended European Search Report for European Patent Application 20162732.0 dated Sep. 28, 2020, 10 pages.

* cited by examiner

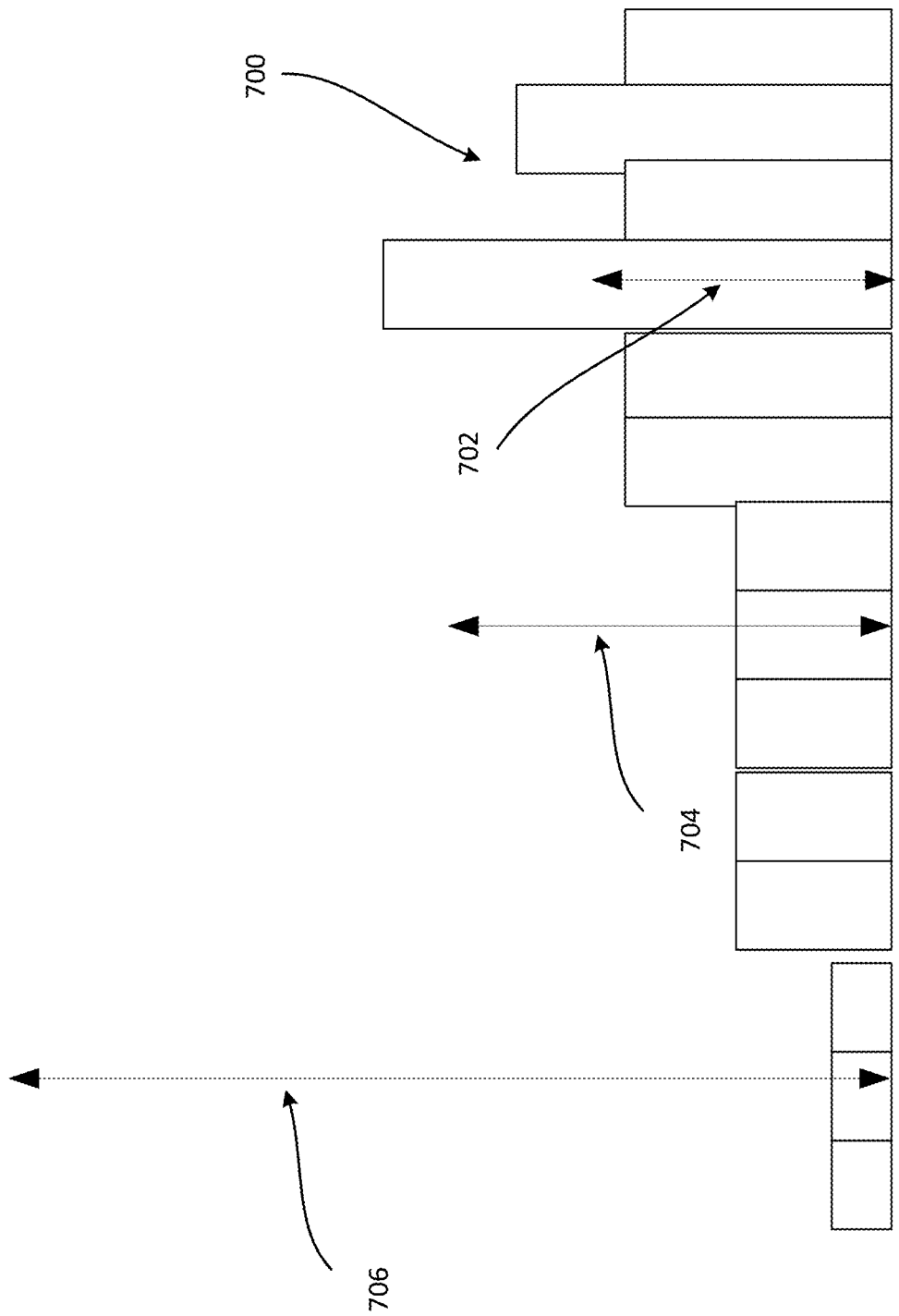

NAVIGATION PERFORMANCE IN URBAN AIR VEHICLES

FIELD

The present disclosure relates to navigation performance of air vehicles, and more particularly to air vehicle navigation performance in urban environments.

BACKGROUND

Pilots of air vehicles today operate in accordance with required navigation performance (RNP). RNP is a form of performance-based navigation that allows an air vehicle to fly a specific path between defined points in space specified by a central agency. In more general settings such as airports, the RNP utilizes pre-defined routes that air vehicles such as commercial airlines should follow to safely take off and arrive in airspace environments. To utilize RNP, each air vehicle must have the capability to follow a designated path with reliability, repeatability, and predictability. The designated path may include curves, vertical angles, altitude constraints, etc. The specific path specified by a central agency is not suitable in a more dynamic setting such as urban airspace where a large number of aerial vehicles cannot be asked to follow pre-defined path procedures by a central agency. Additionally, the central agency may not be able to dynamically and efficiently manage a large number of air vehicles, including personal aerial vehicles and autonomous air vehicles, in an airspace such as an urban air environment.

SUMMARY

In accordance with an embodiment, a method performed by an air vehicle is provided that includes receiving an actual navigation performance (ANP) value from a neighboring air vehicle. The method also includes displaying a representation of the air vehicle and a representation of the neighboring air vehicle on a display. The method also includes determining a combined ANP (CANP) value based on the ANP value from the neighboring air vehicle and an ANP value of the air vehicle. The method also includes comparing a position of the air vehicle to the CANP value. The method also includes responsive to the position of the air vehicle being within a distance margin away from the neighboring air vehicle based on the CANP value, performing an action to increase a distance the air vehicle is from the neighboring vehicle.

In accordance with another embodiment, a navigation device of an air vehicle is provided that includes a wireless interface, a processor in communication with the wireless interface, and a memory comprising instructions, that when executed by the processor cause the processor to perform operations. The operations include receiving an actual navigation performance (ANP) value from a neighboring air vehicle. The operations further include displaying a representation of the air vehicle and a representation of the neighboring air vehicle on a display. The operations further include determining a combined ANP (CANP) value based on the ANP value from the neighboring air vehicle and an ANP value of the air vehicle. The operations further include comparing a position of the air vehicle to the CANP value. The operations further include responsive to the position of the air vehicle being within a distance margin away from the neighboring air vehicle based on the CANP value, performing an action to increase a distance the air vehicle is from the neighboring vehicle.

The CANP and a combined RNP (CRNP) that indicates a distance margin required between a pair of air vehicles enables the use of decentralized and distributed air traffic management (ATM) and may eliminate the need to have pre-defined departure/arrival procedures in busy urban airspace allowing personal and autonomous air vehicles to navigate safely and efficiently.

The features, functions, and advantages that have been discussed can be achieved independently in various embodiments or may be combined in yet other embodiments further details of which can be seen with reference to the following description and drawings

BRIEF DESCRIPTION OF DRAWINGS

FIGS. 7A and 7B are illustrations of a CRNP changing in different areas of an urban environment in accordance with an embodiment of the present disclosure.

DETAILED DESCRIPTION

Figure 1:
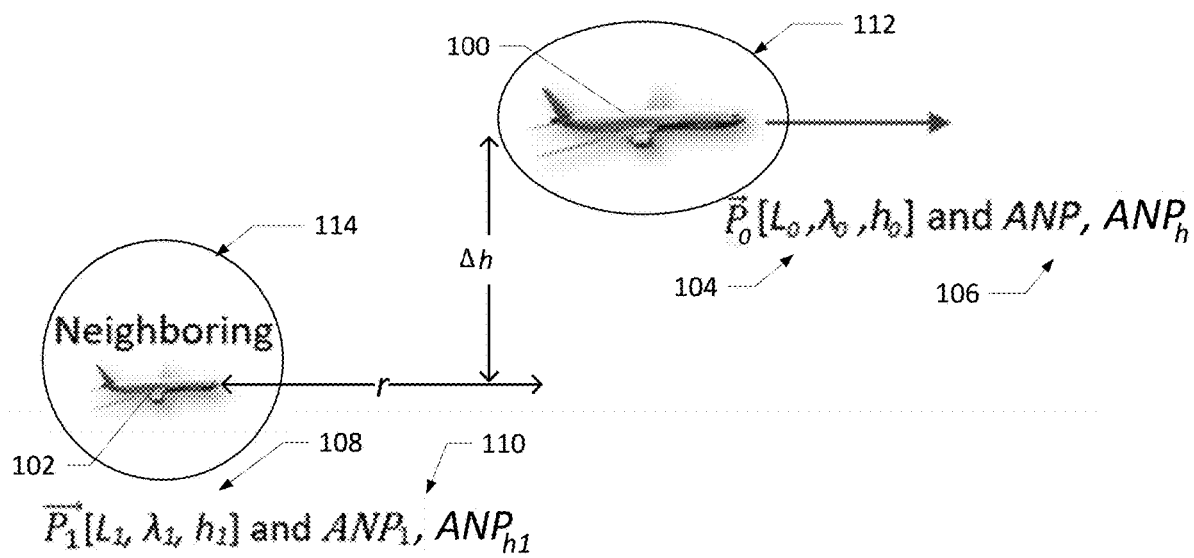
FIG. 1 is an illustration illustrating parameters of air vehicles that may be used in determining whether an action should be taken to keep a distance margin away from each other, according to an embodiment.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings. Various embodiments of the disclosed subject matter are presented. These embodiments are presented as teaching examples and are not to be construed as limiting the scope of the disclosed subject matter. For example, certain details of the described embodiments may be modified, omitted, or expanded upon without departing from the scope of the described subject matter.

While the current definition of Required Navigation Performance (RNP) is concerned about following a specific path as previously described, the RNP is not suitable in a more dynamic setting such as urban airspace where air vehicles cannot be asked to follow pre-defined path procedures by a central agency. The air vehicles may include personal air vehicles, autonomous air vehicles such as drones, air taxis, and unmanned air vehicles, commercial air vehicles such as commercial airlines, and the like.

A combined RNP (CRNP), defined as the level of performance required for each pair of air vehicles to navigate in an airspace is provided to air vehicles as the air vehicles approach a boundary of the airspace. The CRNP may be broadcasted to the air vehicles, provided to the air vehicles in a spreadsheet having CRNP for areas an air vehicle is traveling through to reach its destination, provided in a memory of the air vehicle, etc. The CRNP is a minimum distance margin that an air vehicle must maintain away from a neighboring air vehicle while the air vehicle is traveling to reach the air vehicle's destination. The CRNP may be specified for a lateral direction (i.e., a lateral CRNP) and for a vertical direction (i.e., a vertical CRNP).

Using the combined actual navigation performance (CANP) calculated for a neighboring air vehicle as defined below, the air vehicle may maintain and predict a distance margin to the neighboring vehicle within a certain accuracy. By maintaining the minimum distance margin specified in the CRNP or a distance margin based on the CRNP, an air vehicle can safely navigate to its destination. Since each air vehicle computes its own CANP with each neighboring air vehicle and computes a path to the destination that can maintain the distance margin from neighboring vehicles, there is no need for a centralized entity to control the airspace.

Turning to FIG. 1, an air vehicle 100 and a neighboring air vehicle 102 with their position 104 ($[L_0, \lambda_0, h_0]$) and position 108 ($[L_1, \lambda_1, h_1]$) of latitude L, longitude $\lambda$, and barometric altitude h and values 106, 110 of the actual navigation performance (ANP) 112 and ANP 114, respectively, are illustrated. The ANP is an estimate of the air vehicle's navigation equipment's estimate of the quality of its position determination. The navigation equipment estimates how "reliable" it thinks its own position is. A 95% certainty of the air vehicle's actual position lies within a circle of radius ANP. The ANP may also be called estimated position certainty. If the estimate of reliability is high, then the ANP is lower. A lateral (e.g., latitude/longitude) ANP value of 0.6 indicates that the navigation equipment actual position is within 0.6 nm (nautical mile). In other words, if a point on the map is placed where the navigation equipment calculates where the air vehicle is, there is a circle around that point in the lateral direction with a 0.6 nm radius and the air vehicle is actually somewhere within that circle. Each air vehicle 100 broadcasts the position 104 and ANP value(s) 106 so that neighboring air vehicles 102 receive the $L_0, \lambda_0$, and $h_0$ position 104 information and ANP value(s) 106. The lateral ANP may have a different value than the vertical ANP for the vertical direction (e.g., the altitude) as can be seen by ANP 112. A lateral ANP value and a vertical ANP value are provided when the values are different as indicated by $ANP_h$ and $ANP_{h1}$ in FIG. 1.

Figure 2:
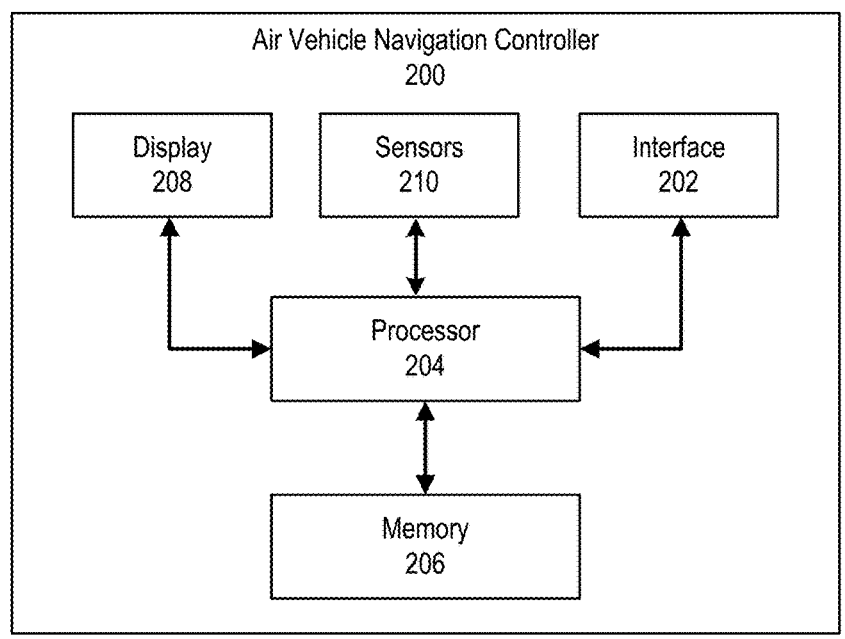
FIG. 2 is a block diagram illustrating components of an air vehicle navigation controller in accordance with an embodiment of the present disclosure.
Figure 3:
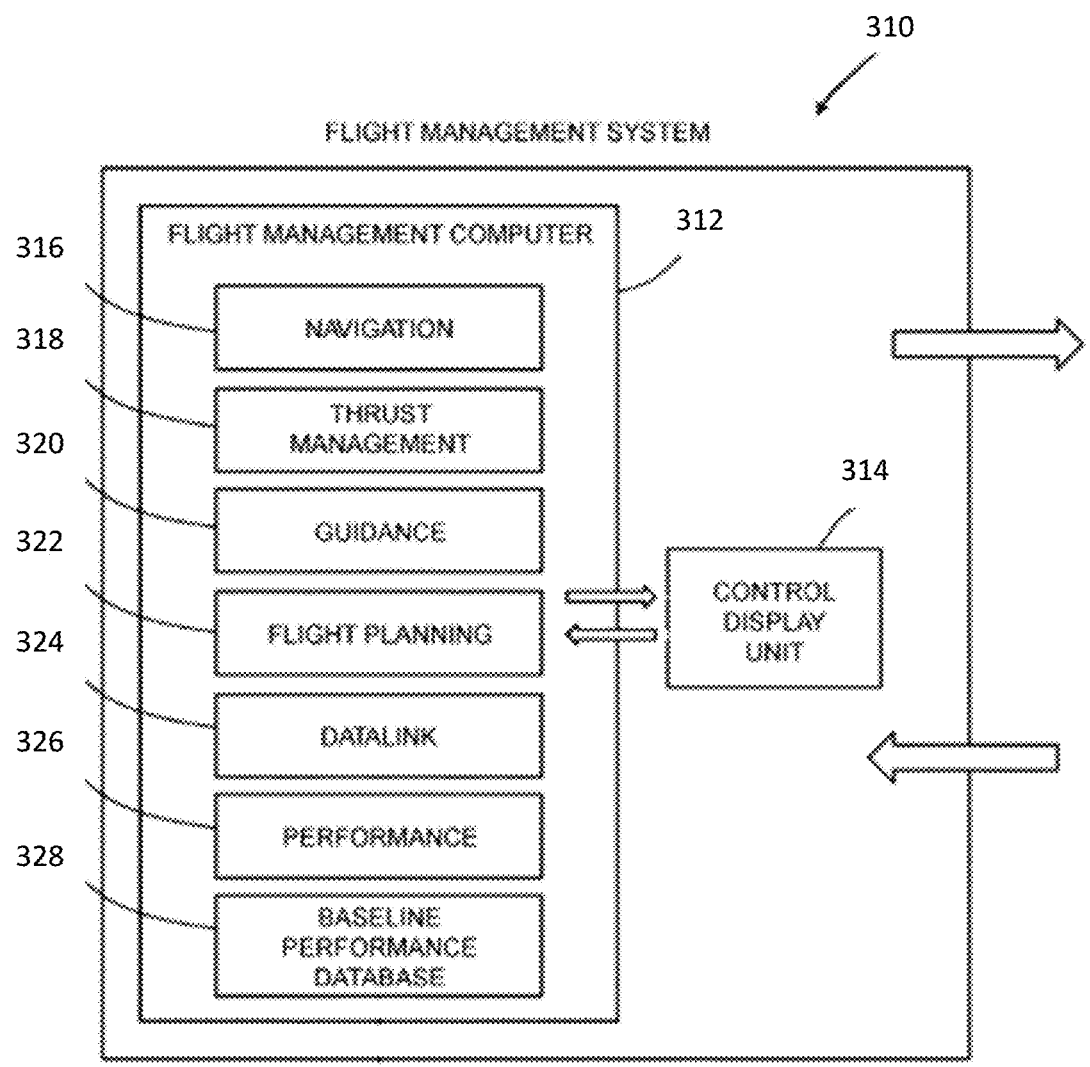
FIG. 3 is an example of an environment in which the navigation controller of FIG. 2 operates.

Turning to FIG. 2, a block diagram illustrating elements of an air vehicle navigation controller 200 of an air vehicle according to an embodiment. As shown, air vehicle navigation controller 200 includes a wireless interface 202 having transceiver circuitry including a transmitter and a receiver configured to provide communications with other air vehicles. Air vehicle navigation controller 200 also includes processing circuitry 204 (also referred to as a processor 204) coupled to the transceiver circuitry, and memory circuitry 206 (also referred to as memory) coupled to the processing circuitry 204. The memory circuitry 206 may include computer readable program code that when executed by the processing circuitry 204 causes the processing circuitry 204 to perform operations according to embodiments disclosed herein. According to other embodiments, processing circuitry 204 may be defined to include memory so that separate memory circuitry is not required. Air vehicle navigation controller 200 also includes display 208 and sensors 210 coupled with processing circuitry 204. The sensors 210 are used in determining the position 104 and the ANP value 106 of the air vehicle 100. In other embodiments, operations of air vehicle navigation controller 200 may be performed by other components of the air vehicle. For example, the air vehicle navigation controller can be integrated with other controllers of the air vehicle as illustrated in FIG. 3.

As discussed herein, operations of air vehicle navigation controller 200 are performed by processing circuitry 204 and/or transceiver circuitry of wireless interface 202. For example, processing circuitry 204 may control transceiver circuitry to transmit communications through transceiver circuitry over a radio interface to other air vehicles and/or to ground stations) and/or to receive communications through transceiver circuitry from other air vehicles over the radio interface. Moreover, modules may be stored in memory circuitry 206, and these modules may provide instructions so that when instructions of a module are executed by processing circuitry 204, processing circuitry 204 performs respective operations (e.g., operations discussed below). The processing circuitry 204 can be further configured to execute program code stored in memory, which may include one or several types of memory such as read-only memory (ROM), random-access memory (RAM), cache memory, flash memory devices, optical storage devices, etc. Program code stored in memory includes program instructions for carrying out one or more of the techniques described herein.

The air vehicle navigation controller 200 can be integrated with other controllers of the air vehicle 100. FIG. 3 provides an example of a flight management system 310 where the air vehicle navigation controller 200 is integrated into the navigation function 316 and/or the performance management function 326 of a flight management system of a type comprising one or more flight management computers and one or more control display units. Only one flight management computer 312 and one control display unit (CDU) 314 are depicted in FIG. 3. The CDUs are the primary interface between the flight management computer 312 and the pilots.

The computer code executed by the flight management computer (hereinafter "FMC software") may reside on respective core processors in respective airplane information management system (AIMS) cabinets. The FMC software may comprise the following: flight management functionality, a navigation function 316, a thrust management function 318, and a baseline performance database 328 (for example, an aero/engine database containing aerodynamic and propulsion data). The flight management functionality comprises guidance 320, flight planning 322, a datalink management function 324, a performance management function 326, CDU interfaces, and other functionalities. The navigation function 316 provides sensor selection (inertial, radio, satellite), position solution determination and other functionalities. The navigation function 316 computes airplane position, velocity, track angle and other airplane parameters, collectively termed airplane states, to support functions such as flight planning, guidance, and display as well as AIMS—external functions.

The flight management system 310 integrates information from an air data and inertial reference system, navigation sensors, engine and fuel sensors, and other airplane systems (not shown in FIG. 3), along with internal databases and crew-entered data to perform the multiple functions. The flight management computer may contain a navigation database (not shown in FIG. 3).

Figure 4:
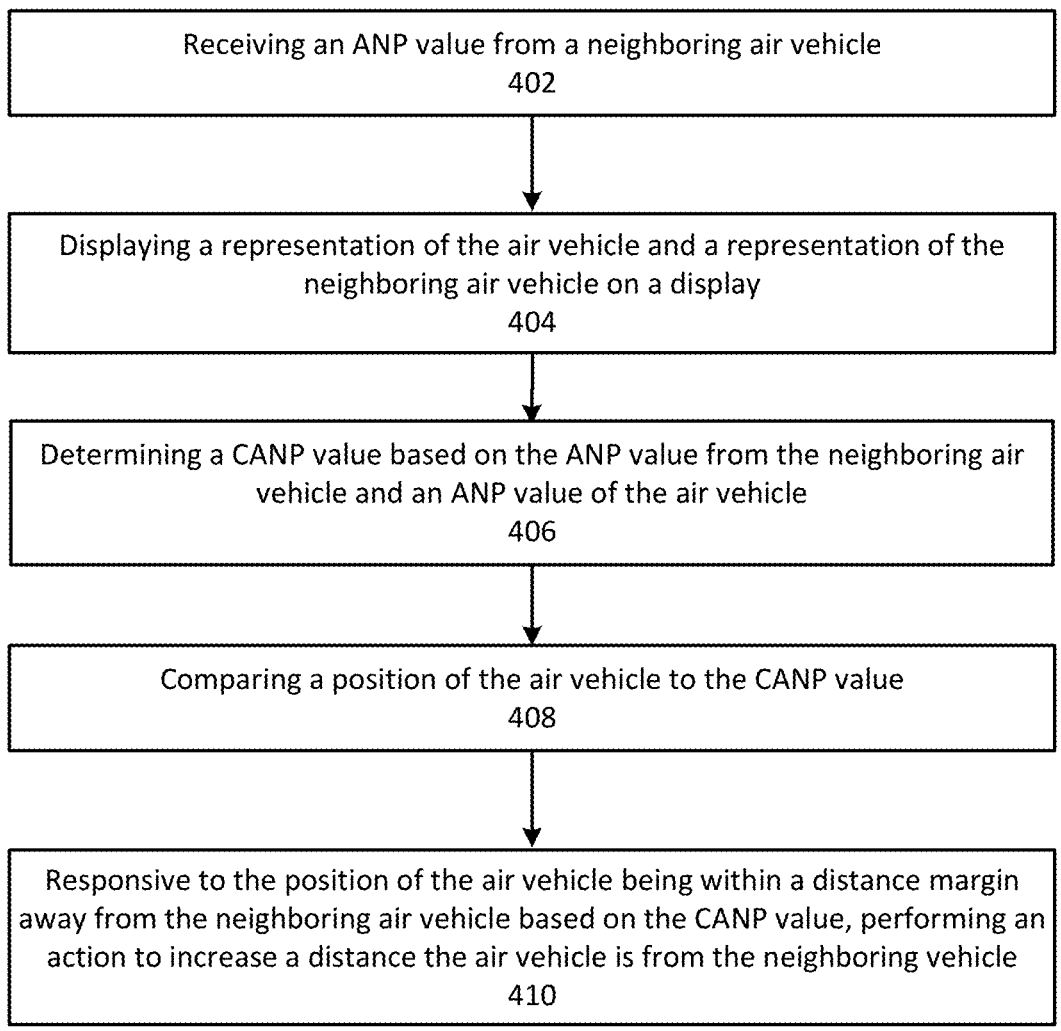
FIG. 4 is a flow chart of an example of a method performed by an air vehicle in accordance with an embodiment of the present disclosure.

Turning to FIG. 4, operations the processor 204 performs to maintain the distance margin includes receiving an actual navigation performance (ANP) value 110 from a neighboring air vehicle 102 in operation 402. The processor 204 may receive the ANP value 110 via wireless interface 202.

In operation 404, processor 204 displays a representation of the air vehicle 100 and a representation of the neighboring air vehicle 102 on a display. The display may be display 208 and/or another display on the air vehicle. Examples of displaying the representations of the air vehicle 100 and the neighboring air vehicles 102 are illustrated in FIGS. 8-13.

In operation 406, the processor 204 determines a combined ANP (CANP) value based on the ANP value 110 from the neighboring air vehicle 102 and an ANP value 106 of the air vehicle 100. In one embodiment, the CANP value comprises a lateral CANP value and a vertical CANP value. The lateral CANP value and the vertical CANP value may be the same value or a different value.

The lateral CANP is obtained by determining CANP= $\sqrt{ANP^2+ANP_1^2}$. Proof of this determination follows. Two air vehicle positions in the North-East-down (NED) frame (reference to a common local position) can be derived as $[x_N, x_E, x_D]$ and $[x_{N1}, x_{E1}, x_{D1}]$. The north-east-down (NED) system is a non-inertial system with its origin fixed at the air vehicle's center of gravity. Its axes are oriented along the geodetic directions defined by the Earth's surface. Specifically, The N-axis points north parallel to the geoid surface, in the polar direction, the E-axis points east parallel to the geoid surface, along a latitude curve, and the D-axis points downward, toward the Earth's surface, antiparallel to the surface's outward normal n. Thus, the horizontal location of an air vehicle is specified as an $x_N$ position and an $x_E$ position. The horizontal distance between the two air vehicles can be expressed in the NED frame as $$r = \sqrt{(x_N - x_{N1})^2 + (x_E - x_{E1})^2}$$

The vertical distance Δh between the two air vehicles can be expressed as the difference between $x_D$ and $x_{D1}$.

As may be known from the ANP, for a 95% position accuracy of the air vehicles, the $x_N$ is Normally distributed with zero mean and standard deviations of $$\frac{ANP}{2.45}.$$

The 2.45 represent 95% probability bound of a random variable with Rayleigh distribution with mode of 1.

That is, $$x_N \sim N\left(0, \frac{ANP}{2.45}\right),$$

so is $x_E$.

Similarly, $$x_{N1} \sim N\left(0, \frac{ANP_1}{2.45}\right),$$

so is $x_{E1}$.

Thus, $$x_N - x_{N1} \sim N\left(0, \frac{\sqrt{ANP^2 + ANP_1^2}}{2.45}\right)$$

From the above, it can be seen that the distance r is a random variable with Rayleigh probability density function (PDF) and its 95% probability bound of r, i.e., the lateral CANP, is $\sqrt{ANP^2+ANP_1^2}$. Thus, the lateral CANP is $\sqrt{ANP^2+ANP_1^2}$.

The vertical CANP is $\sqrt{ANP_h^2+ANP_{h1}^2}$ and proof can be similarly determined assuming that the air vehicle vertical distance h is Normally distributed with zero mean. With this assumption, the calculations used to determine the horizontal CANP can be applied to the vertical distance of the two air vehicles. With the same 95% error bound, the vertical CANP of the two air vehicles are $ANP_h$ and $ANP_{h1}$. The resulting 95% probability of vertical distance, the vertical CANP, is $\sqrt{ANP_h^2+ANP_{h1}^2}$.

Additionally, the 3-D distance ρ between the two air vehicles may be derived as:

$$\rho = \sqrt{(x_N - x_{N1})^2 + (x_E - x_{E1})^2 + (x_D - x_{D1})^2} = \sqrt{r^2 + h^2}$$

It is reasonable to assume the error distributions of r and h are independent, with the error of r is Rayleigh distribution, while h is zero mean normally distributed. The joint PDF is:

$$f_{rh}(r,h) = f_R(r) \cdot f_H(h) = \frac{r}{\sigma_n^2} e^{-r^2/2\sigma_n^2} \cdot \frac{1}{\sqrt{2\pi\sigma_h^2}} e^{-h^2/2\sigma_h^2}$$

This equation may be simplified as $$f_{rh}(r,h) = \frac{r}{\sqrt{2\pi}\,\sigma_n^2 \sigma_h} e^{-r^2/2\sigma_n^2 - h^2/2\sigma_h^2}$$

where $$\sigma_n = \frac{\sqrt{ANP^2 + ANP_1^2}}{2.45} \text{ and } \sigma_h = \frac{\sqrt{ANP_h^2 + ANP_{h1}^2}}{1.96}.$$

The cumulative distribution of ρ can be computed as $$F_\gamma(\rho) = \int_{-\rho}^{\rho} \int_0^{\sqrt{\rho^2-h^2}} f_{rh}(r,h) dr dh$$

By replacing $f_{rh}(r,h)$ into the above equation, $$F_\gamma(\rho) = \frac{2}{\sqrt{2\pi}\,\sigma_h} \int_0^\rho \left(e^{-h^2/2\sigma_h^2 - (\rho^2-h^2)/2\sigma_r^2} - e^{-h^2/2\sigma_h^2}\right) dh$$

The 95% probability bound of ρ, the CANP$_\rho$, can be computed by solving for ρ with $F_\gamma(\rho)=95\%$.

In operation 408, the processor 204 compares a position of the air vehicle 100 to the CANP value determined in operation 406. In operation 410, responsive to the position of the air vehicle 100 being within a distance margin away from the neighboring air vehicle 102 based on the CANP value, an action is performed to increase a distance the air vehicle 100 is from the neighboring vehicle 102. The distance margin is a distance the air vehicle 100 must keep away from each neighboring air vehicle 102 in a defined airspace.

Figure 6A:
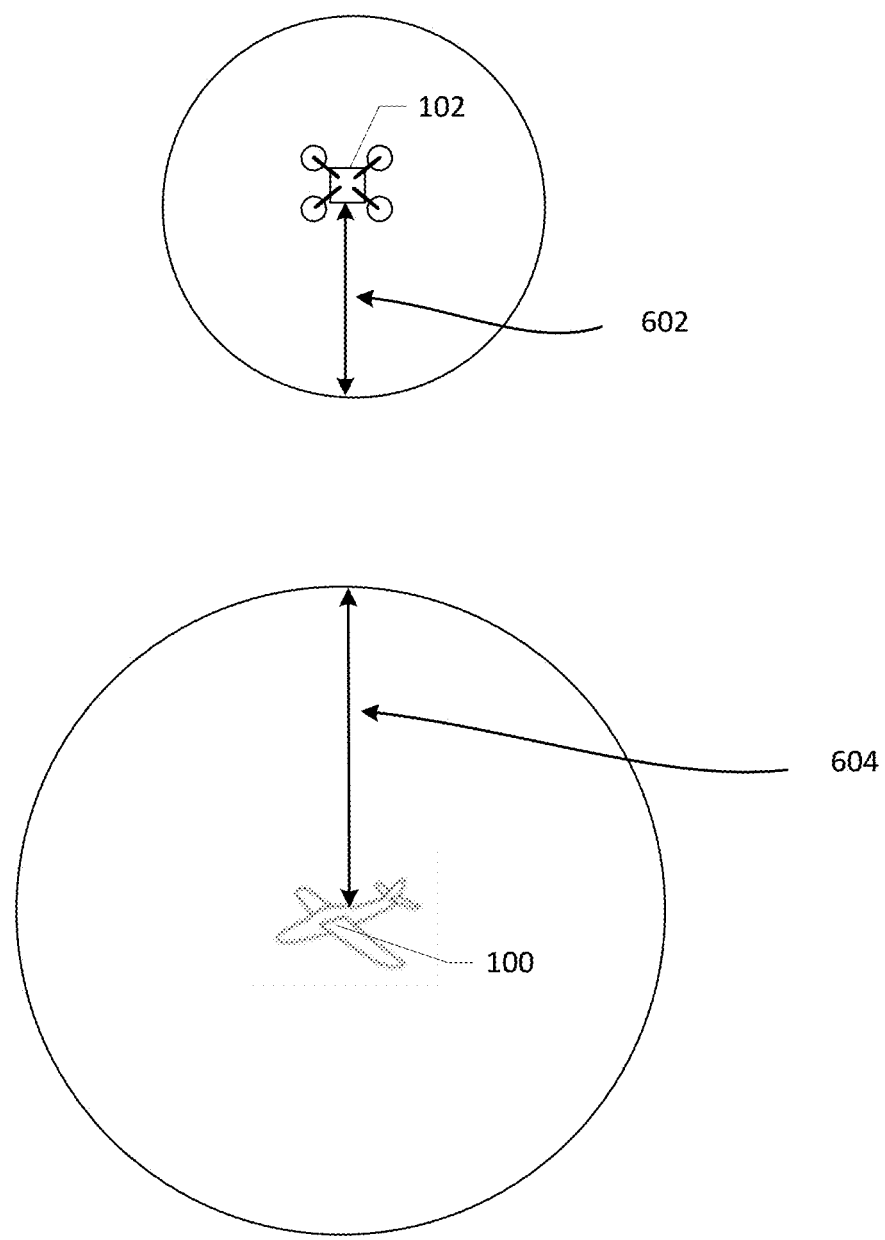
FIGS. 6A and 6B are an illustration of an example of a distance margin and a CANP value in accordance with an embodiment of the present disclosure.
Figure 6B:
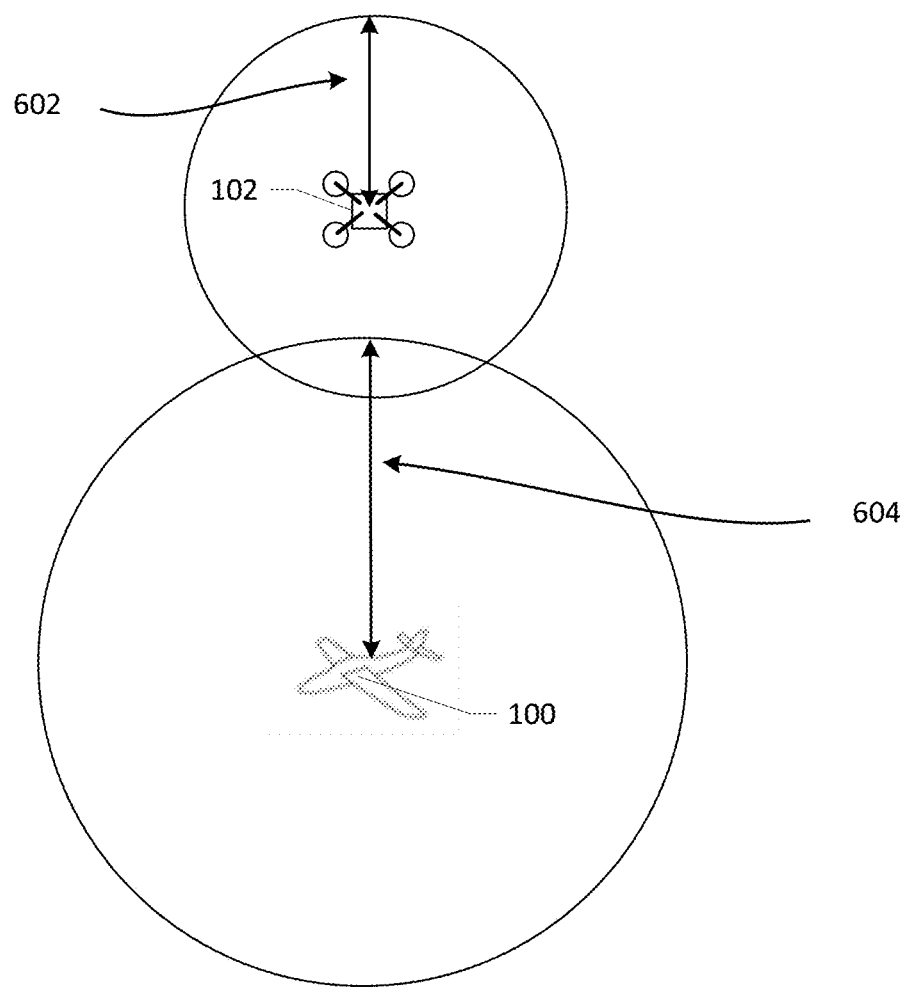

Turning to FIG. 6A, an example of a CANP value 602 of a neighboring air vehicle 102 and the distance margin 604 of air vehicle 100 is illustrated. The air vehicle 100 must not let the distance margin 604 be within the CANP value 602 as illustrated in FIG. 6B where the distance margin 604 is within the CANP value. In other words, the position of the air vehicle 100 is within a distance margin away from the neighboring air vehicle 102 based on the CANP value 602.

Figure 5:
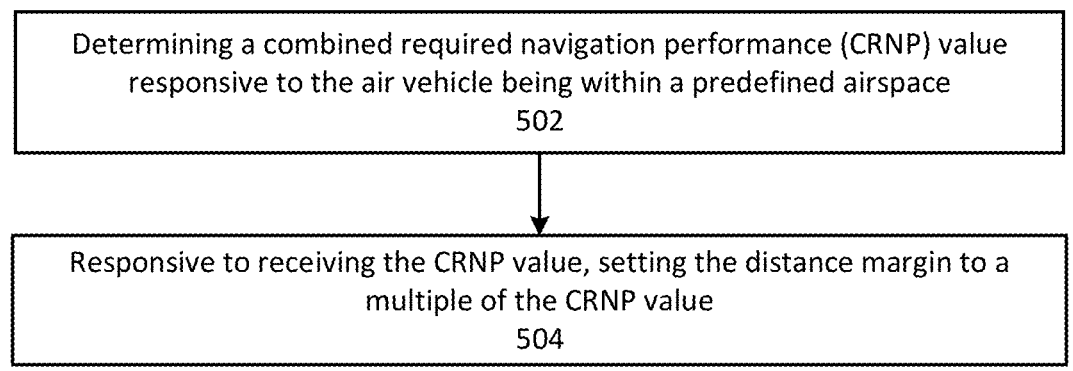
FIG. 5 is a flow chart of an example of a method performed by an air vehicle in accordance with an embodiment of the present disclosure.

This distance margin 604 in one embodiment is based on the combined required navigation performant (CRNP). Turning to FIG. 5, in operation 502, the processor 204 determines a CRNP value responsive to the air vehicle 100 being within a predefined airspace. The CRNP value in one embodiment consists of a lateral CRNP value and a vertical CRNP value. The predefined airspace may broadcast the CRNP value(s) such that each CRNP value is determined before the air vehicle enters the predefined airspace. Responsive to receiving the CRNP value, the distance margin is set to a multiple of the CRNP value in operation 504. For example, the distance margin may be set to 1×the CRNP value, 1.5×the CRNP value, 2×the CRNP value, 2.5× the CRNP value, etc. The lateral CRNP and the vertical CRNP in one embodiment are a function of the air traffic density in the defined airspace and/or the distance to the destination of the air vehicle, and/or the altitude of the air vehicle. For example, if the altitude of an air vehicle is tens of thousands of feet the vertical CRNP and the lateral CRNP may be higher than when the air vehicle is approaching a landing at the destination of the air vehicle.

Figure 7B:
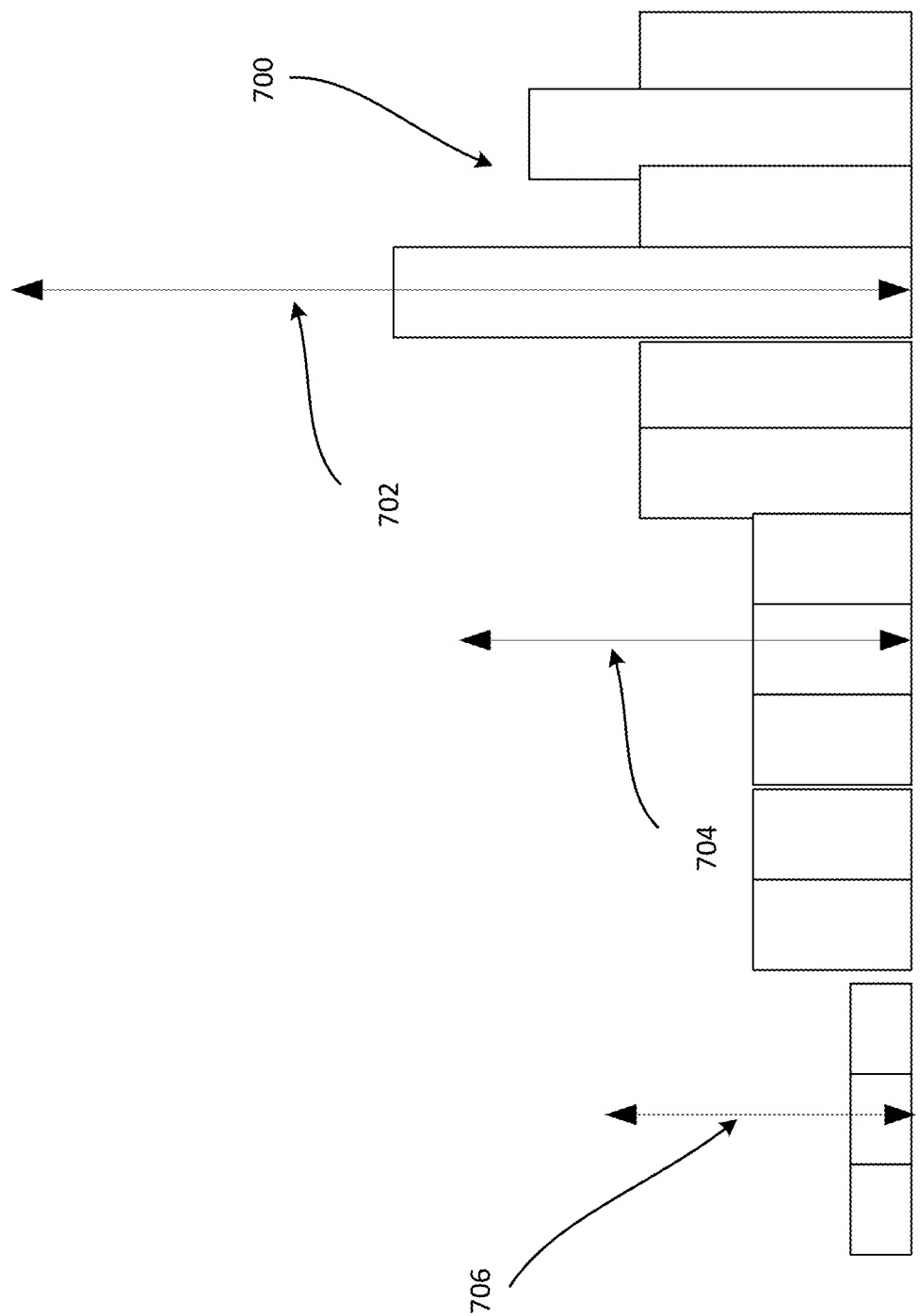

Turning to FIGS. 7A and 7B, an illustration of how the CRNP value in the vertical direction (i.e., the vertical CRNP) can change in a predefined airspace such as an urban airspace 700 is provided. The CRNP may be broadcasted to the air vehicles as the air vehicles approach the urban airspace 700, provided to the air vehicles in a spreadsheet having CRNP for areas an air vehicle is traveling through to reach its destination, provided in a memory of the air vehicle, etc. In FIG. 6A, the vertical CRNP value in the urban airspace 700 decreases from CRNP value 706 to CRNP value 704 to CRNP value 702 as the air vehicle travels from an outer area of the defined airspace towards a center of the defined airspace. In FIG. 7B, the vertical CRNP value increases from CRNP value 706 to CRNP value 704 to CRNP value 702 as the air vehicle travels from an outer area of the defined airspace towards a center of the defined airspace. In other embodiments, the CRNP value is the same value across the defined airspace. The CRNP value in an embodiment changes based on changes in air traffic density, based on a change in air vehicle altitude, and/or a distance the air vehicle is from its destination. The CRNP in the lateral direction (i.e., the lateral CRNP) may change in a similar fashion. Thus, one or both of the lateral CRNP and vertical CRNP may dynamically change. In other words, one (or both) of the lateral CRNP value and the vertical CRNP value is a dynamic required distance margin.

Figure 8:
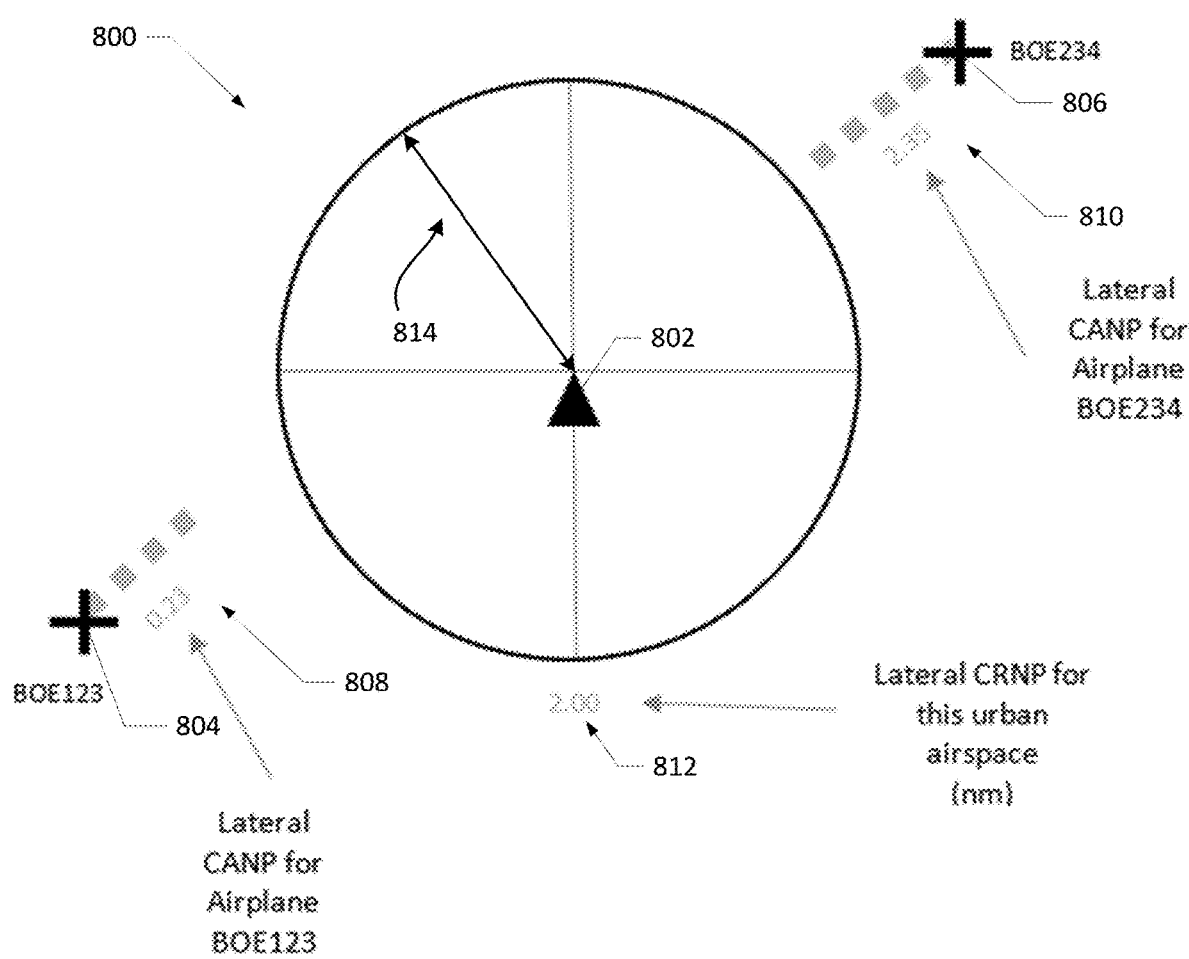
FIG. 8 is an illustration of a lateral two-dimensional display of an air vehicle when the CANP of neighboring air vehicles are outside of the lateral CRNP for an airspace in accordance with an embodiment of the present disclosure.

FIG. 8 illustrates an embodiment of a lateral two-dimensional display 800 displayed in an air vehicle 100 with the air vehicle 100 designated by icon 802. Neighboring air vehicles 102 are each represented by the "+" icon. To distinguish the neighboring air vehicles 102 from each other, one of the neighboring air vehicles 102 will be referred to as neighboring air vehicle 804 and another of the neighboring air vehicles 102 will be referred to as neighboring air vehicle 806. The distance margin 604 may be a lateral distance margin or a vertical distance margin. The lateral distance margin shall be designated as distance margin 814. The lateral CANP 808, 810 determined (e.g., determined in operation 406) for each of the neighboring air vehicles 804, 806, respectively, are each illustrated by a dashed line originating from the center of the representation of the neighboring air vehicles with the values of the lateral CANP 808, 810 being below the dashed lines. The lateral CRNP 812 for the airspace is displayed below the distance margin 814. The distance margin 814 is set to the lateral CRNP 812 in the embodiment shown. In other embodiments, the distance margin 814 may be set to a value higher than the lateral CRNP value 812 as described above. In further embodiments, the distance margin 814 may vary with respect to the direction the air vehicle 100 is traveling. For example, if the air vehicle 100 is following an existing flight path with an air vehicle that produces a large amount of turbulence in front of the air vehicle 100, the distance margin 814 in the direction the air vehicle 100 is traveling may be set to a higher value than distance margins in other lateral directions. Thus, the distance margin may dynamically change based on conditions. FIG. 8 illustrates that the neighboring air vehicles 804, 806 are both outside of the distance margin 814 for the airspace. Thus, no action is required to be performed to increase a distance the air vehicle 100 is from the neighboring air vehicles 804, 806.

Figure 9:
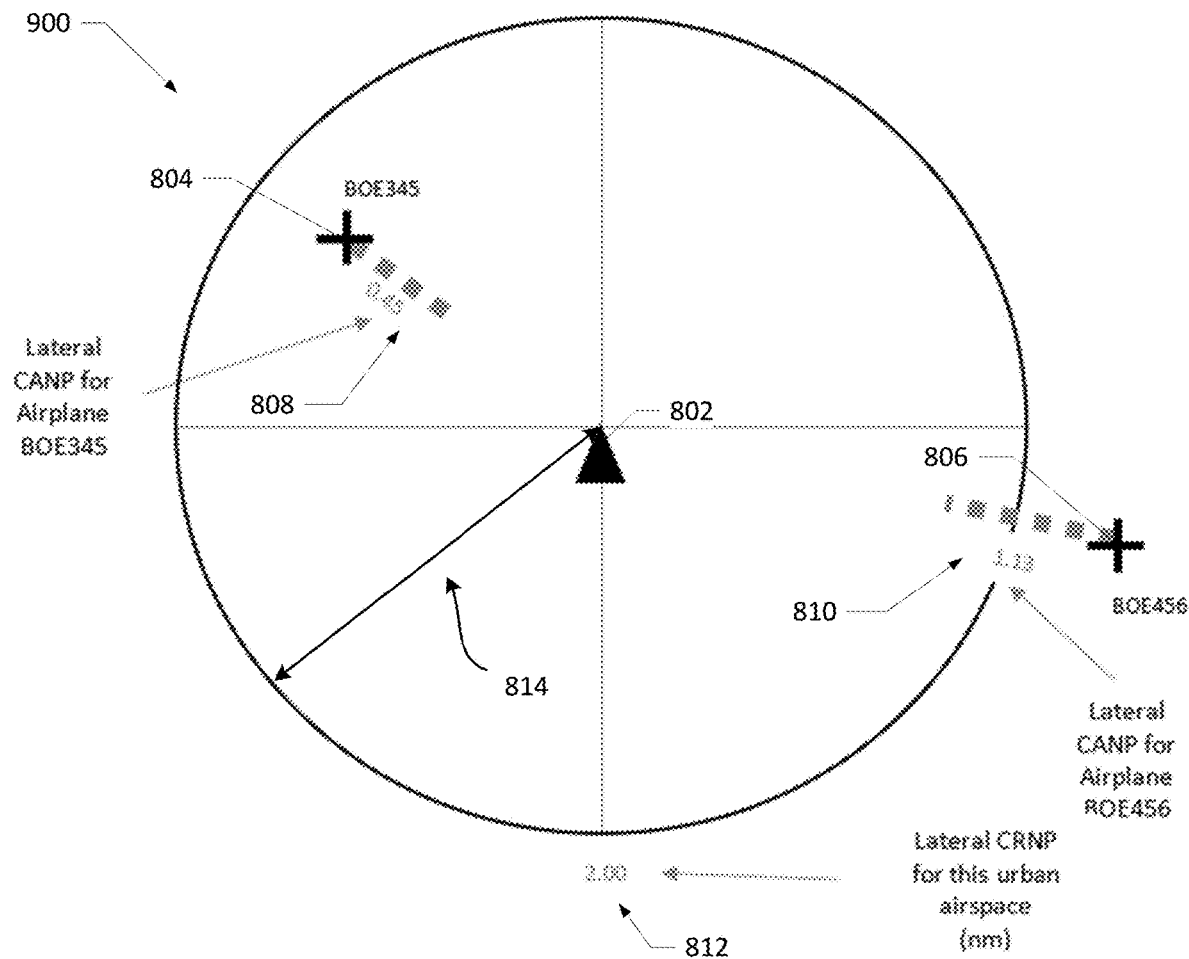
FIG. 9 is an illustration of a lateral two-dimensional display of an air vehicle when the CANP of neighboring air vehicles are inside of the lateral CRNP for an airspace in accordance with an embodiment of the present disclosure.

FIG. 9 illustrates the lateral two-dimensional display 900 displayed in air vehicle 100 when the CANP 808 of neighboring air vehicle 804 is completely within the distance margin 814 and a portion of the CANP 810 of neighboring air vehicle 806 is within the distance margin. An action is taken to have one or more of the air vehicle 100 and neighboring air vehicles 804, 806 move in a direction such that the lateral CANPs 808, 810 of neighboring air vehicles 804, 806 are outside of the distance margin 814. In a different embodiment, the air vehicle 100 checks the vertical CANPs 1002, 1004 (see FIGS. 10 and 11) and performs the action only when the corresponding vertical CANPs 1002, 1004 are within the distance margin in the vertical direction, which is designated as distance margin 1008.

Figure 10:
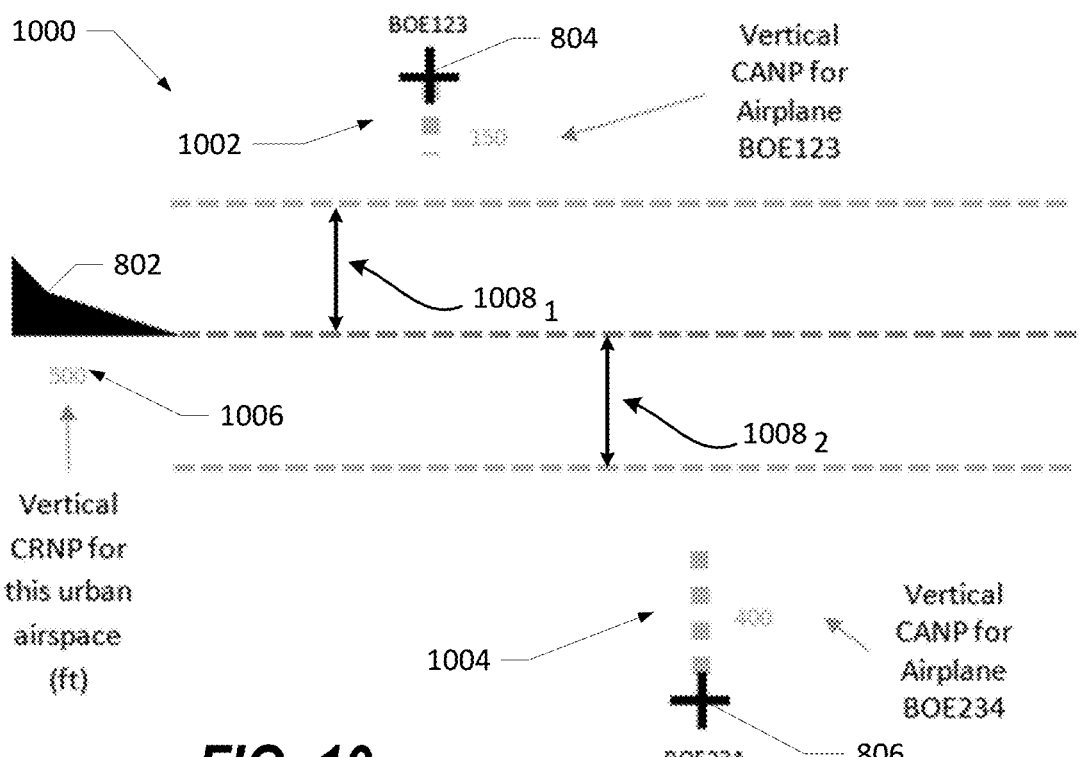
FIG. 10 is an illustration of a vertical two-dimensional display of an air vehicle when the CANP of neighboring air vehicles are outside of the vertical CRNP for an airspace in accordance with an embodiment of the present disclosure.

Turning to FIG. 10, an embodiment of a vertical two dimensional display 1000 of an air vehicle 100 is illustrated. Neighboring air vehicles 804 and 806 are again represented by the "+" icon. The vertical CANP 1002, 1004 determined (e.g., in operation 406) for each of the neighboring air vehicles 804, 806 are each illustrated by a dashed line originating from the center of the neighboring air vehicles. The vertical CRNP 1006 for the airspace is displayed below the the icon 802 of the air vehicle 100. In the embodiment shown, the CRNP distance and vertical CANP are displayed in U.S. feet units. Other units such as meters may be used. The distance margin $1008_1$, $1008_2$ are set to the vertical CRNP 1006 in the embodiment shown. In other embodiments, the distance margin may be set to a value that is different (e.g., higher) than the vertical CRNP 1006. In further embodiments, the distance margin $1008_1$ is set to a different value than the value of distance margin $1008_2$. FIG. 10 illustrates that the neighboring air vehicles 804, 806 are both outside of the distance margins $1008_1$, $1008_2$ of air vehicle 100 for the airspace. Thus, no action is required to be performed to increase a distance the air vehicle 100 is from the neighboring air vehicles 804, 806.

Figure 11:
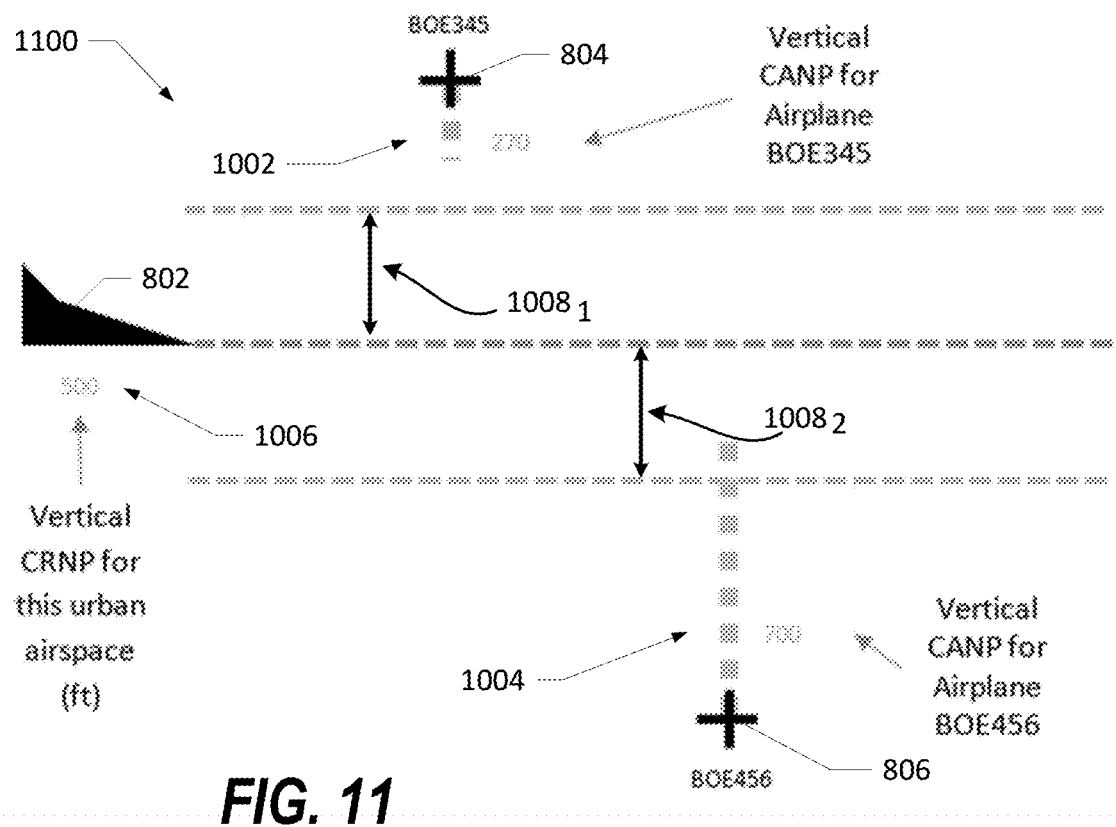
FIG. 11 is an illustration of a vertical two-dimensional display of an air vehicle when the CANP of a neighboring air vehicle is inside of the vertical CRNP for an airspace in accordance with an embodiment of the present disclosure.

FIG. 11 illustrates a vertical two-dimensional display 1100 of the air vehicle 100 when a portion of the vertical CANP 1004 of neighboring air vehicle 806 is within the distance margin 10082. An action is taken to have one or more of the air vehicle 100 and neighboring air vehicle 806 move in a direction such that the vertical CANP 1004 of neighboring air vehicle 806 is outside of the distance margin $1008_2$ while also keeping the vertical CANP 1002 of neighboring air vehicle 804 outside of the distance margin $1008_1$. In a different embodiment, the air vehicle 100 also checks the lateral CANP 810 (see FIGS. 8 and 9) and performs the action when the lateral CANP 810 is within distance margin 814 in the lateral direction.

Figure 12:
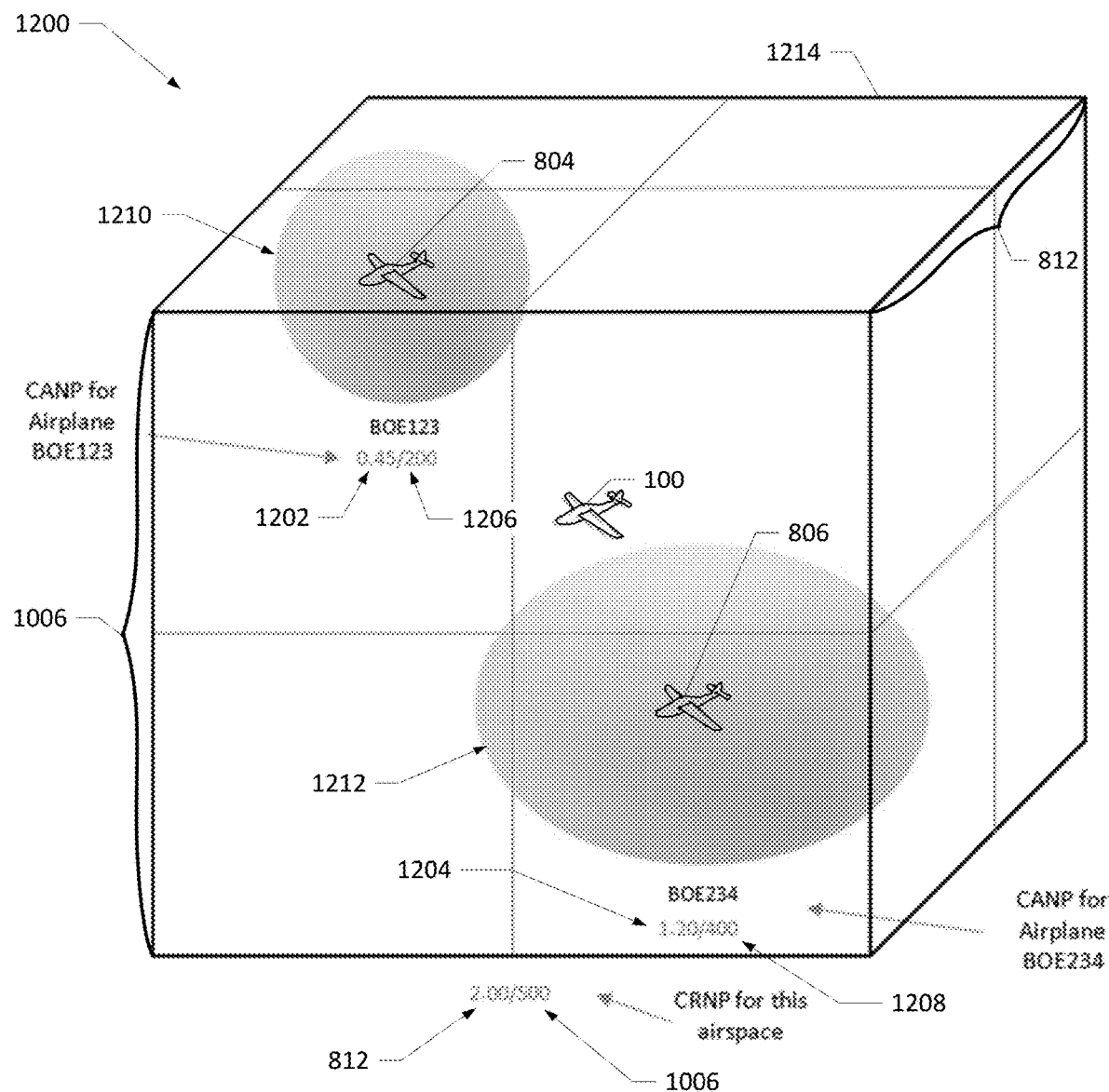
FIG. 12 is an illustration of a three-dimensional display of an air vehicle displaying CANPs of neighboring air vehicles in accordance with an embodiment of the present disclosure.

FIG. 12 illustrates a three dimensional display 1200 with the air vehicle 100 represented by a plane icon displayed at or near the middle of the three dimensional display 1200. Neighboring air vehicles 804 and 806 are also displayed with a plane icon. The values 1202, 1204 of the lateral CANP 808, 810 and the values 1206, 1208 of the vertical CANP 1002, 1004 of the neighboring air vehicles 804, 806 are listed below an identification of each of the neighboring air vehicles 804, 806. The lateral CRNP 812 and vertical CRNP 1006 are also provided in the three dimensional display 1200. A three dimensional CANP representation 1210, 1212 of the CANPs 808, 810, 1002, 1004 of the neighboring air vehicles 804, 806 is provided for each of the neighboring air vehicles 804, 806. Air vehicle 100 must keep a distance margin away from the three dimensional CANP representation 1210, 1212.

Air vehicle 100 has to keep a distance margin away from entering either of the three dimensional CANP representations 1210, 1212. The three dimensional box 1214 can be thought of as the distance margin similar to distance margins 814 and 1008. The three dimensional box 1214 consists of the vertical CRNP 1006 and the lateral CRNP 812. Both neighboring air vehicles 804, 806 are within the distance margin (i.e., three dimensional box 1214). Thus, an action needs to be performed to move the neighboring air vehicles 804, 806 outside of the three dimensional box 1214 (i.e., outside the distance margin) and/or move the air vehicle 100 such that the air vehicles 804, 806 are outside the three dimensional box 1214.

Figure 13:
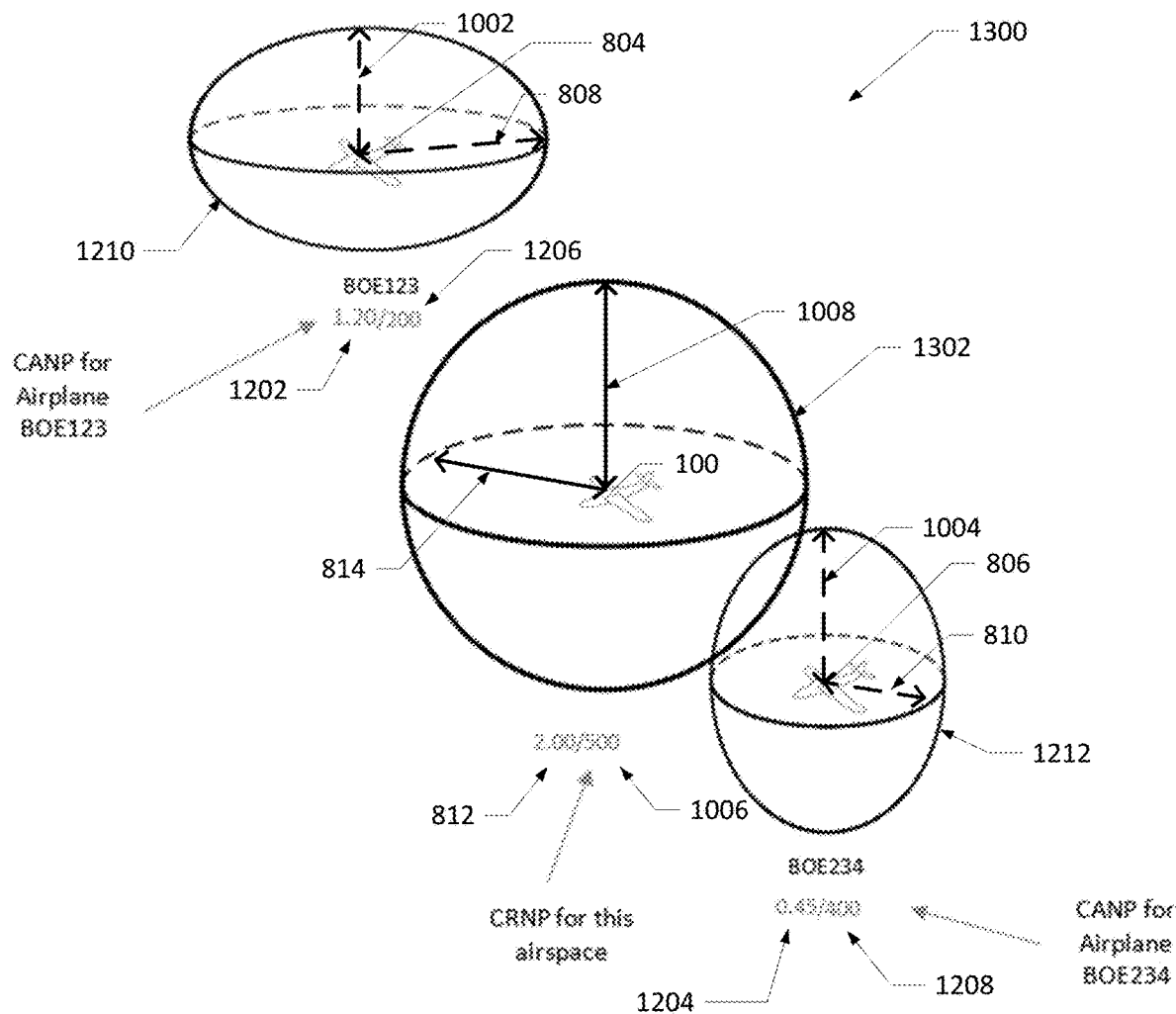
FIG. 13 is an illustration of another embodiment of a three-dimensional display of an air vehicle displaying CANPs for neighboring air vehicles in accordance with an embodiment of the present disclosure.

FIG. 13 illustrates another embodiment of a three-dimensional display 1300 without the three dimensional box 1214 of FIG. 12. The distance margin 604 in this embodiment is a three-dimensional distance margin 1302. The lateral distance margin 814 and the vertical distance margin 1008 of the three-dimensional distance margin 1302 of air vehicle 100 are shown. The lateral distance margin 814 may be set to the lateral CRNP 812 or a multiplier of the value of the lateral CRNP 812. Similarly, the vertical distance margin 1008 may be set to the vertical CRNP 1006 or a multiplier of the value of the vertical CRNP 1006. Neighboring air vehicles 804 and 806 are also displayed with a plane icon. The values 1202, 1204 of the lateral CANP 808, 810 and the values 1206, 1208 of the vertical CANP 1002, 1004 of the neighboring air vehicles 804, 806 are listed below an identification of the respective neighboring air vehicles 804, 806.

The three dimensional distance margin 1302 of air vehicle 100 is outside of the three dimensional CANP representation 1210 having lateral CANP 808 and vertical CANP 1002 of neighboring air vehicle 804. Thus, no action is required to be performed to increase a distance the air vehicle 100 is from the neighboring air vehicle 804. However, a portion of the three dimensional CANP representation 1212 having lateral CANP 810 and vertical CANP 1004 of neighboring air vehicle 806 is within the three dimensional distance margin 1302. In other words, the position of the air vehicle 100 is within a distance margin away from the neighboring air vehicle 806 based on the CANP value 810, 1004 of the neighboring air vehicle 806. Thus, an action is required to be performed to increase a distance the air vehicle 100 is from the neighboring air vehicle 806. The action may be to have one or more of the air vehicle 100 and neighboring air vehicle 806 move in a direction such that the three dimensional CANP representation 1212 of lateral CANP 810 and vertical CANP 1004 of neighboring air vehicle 806 is outside of the three dimensional distance margin 1302.

Figure 14:
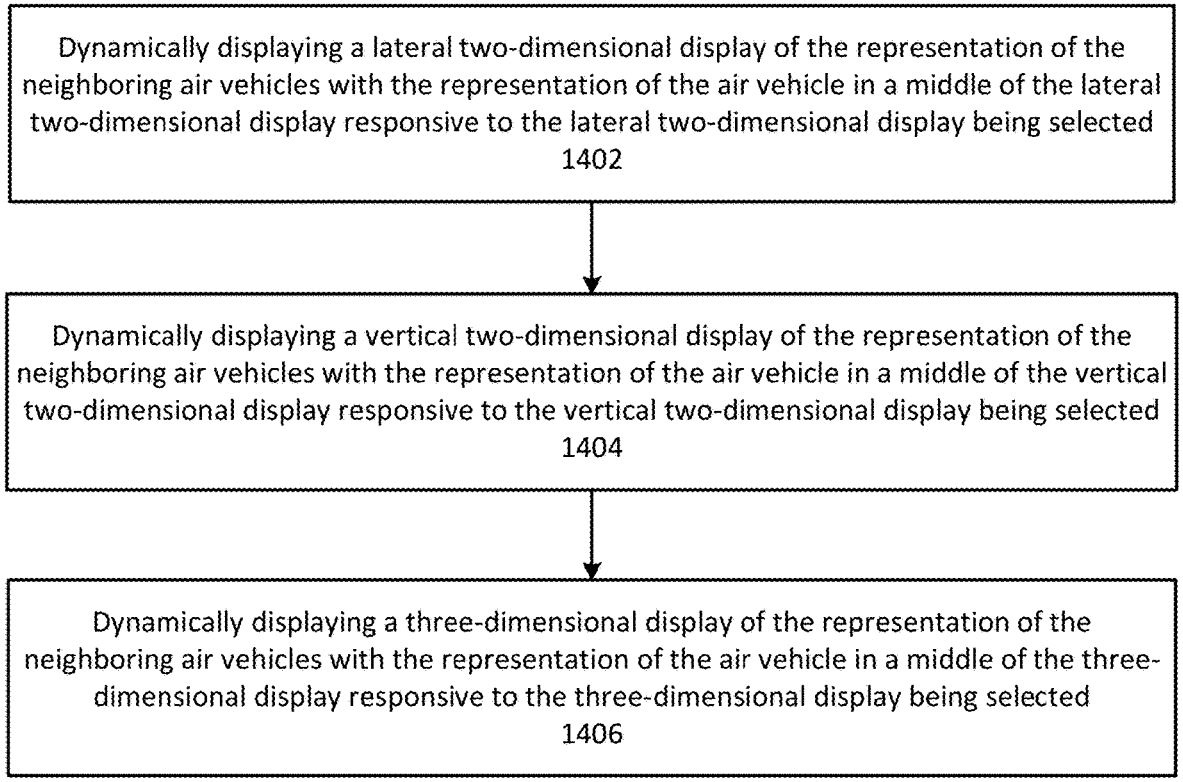
FIG. 14 is a flow chart of an example of a method performed by an air vehicle in accordance with an embodiment of the present disclosure.

A controller of the air vehicle 100 (e.g., pilot, co-pilot, remote controller of an autonomous air vehicle or an unmanned air vehicle, etc.) may designate which type of display is to be displayed. Turning to FIG. 14, a lateral two-dimensional display 800, 900 of the representation of the neighboring air vehicles 804, 806 with the representation of the air vehicle 100 in a middle of the lateral two-dimensional display 800, 900 is dynamically displayed responsive to the lateral two-dimensional display 800, 900 being selected in operation 1402. A vertical two-dimensional display 1000, 1100 of the representation of the neighboring air vehicles 804, 806 with the representation of the air vehicle 100 in a middle of the vertical two-dimensional display 1000, 1100 is dynamically displayed responsive to the vertical two-dimensional display 1000, 1100 being selected in operation 1404. A three-dimensional display 1200, 1300 of the representation of the neighboring air vehicles 804, 806 with the representation of the air vehicle 100 in a middle of the three-dimensional display 1200, 1300 is dynamically displayed responsive to the three-dimensional display 1200, 1300 being selected in operation 1406.

In other embodiments, the selected display is only shown when the CANP of an air vehicle is within a threshold distance away from the distance margin, at the distance margin, etc. In another embodiment, an indication is also provided when the CANP of an air vehicle is within a threshold distance away from the distance margin. This indication may be a chime or other audible sound, a flashing light, etc. The indication may be the same indication for the lateral distance margin and the vertical distance margin or be different. In other embodiments, there are more than one threshold distance. For example if two thresholds are used, a first indication is provided when the air vehicle 100 travels within the first threshold distance. A second indication is provided when the air vehicle 100 travels within the second threshold distance. The second indication can be the same type of indication as the first indication or a different type of indication.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "include," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the disclosure to the specific embodiments described herein.

What is claimed is:

1. A method performed by an air vehicle having navigational equipment, the method comprising:
   receiving, via a wireless interface of the navigation equipment, a position of a neighboring air vehicle and an actual navigation performance (ANP) value of the neighboring air vehicle from the neighboring air vehicle;
   displaying a representation of the air vehicle and a representation of the neighboring air vehicle on a display;
   determining a combined ANP (CANP) value using processing circuitry of the navigational equipment based on the ANP value from the neighboring air vehicle and an ANP value of the air vehicle determined by the processing circuitry of the navigation equipment;
   comparing a position of the air vehicle to the CANP value; and
   responsive to the position of the air vehicle being within a distance margin away from the neighboring air vehicle based on the CANP value, using the processing circuitry of the navigational equipment to perform an action to increase a distance the air vehicle is from the neighboring air vehicle.

2. The method of claim 1, wherein performing the action comprises requiring one of the air vehicle or the neighboring air vehicle to move away from the other of the air vehicle or the neighboring air vehicle.

3. The method of claim 1 wherein the neighboring air vehicle comprises a plurality of neighboring air vehicles and wherein determining the CANP value comprises for each of the plurality of neighboring air vehicles, determining the CANP value based on the ANP value from the neighboring air vehicle and the ANP value of the air vehicle.

4. The method of claim 1 wherein determining the CANP value comprises calculating $$CANP_l = \sqrt{ANP^2_l + ANP^2_{l1}}$$

and $$CANP_h = \sqrt{ANP_h^2 + ANP_{h1}^2}$$

where $CANP_l$ is a CANP value in a lateral direction, $ANP_l$ is an ANP value of the air vehicle in the lateral direction, $ANP_{l1}$ is an ANP value of the neighboring air vehicle in the lateral direction, $CANP_h$ is a CANP value in a vertical direction, $ANP_h$ is an ANP value of the air vehicle in the vertical direction, and $ANP_{h1}$ is an ANP value of the neighboring air vehicle in the vertical direction.

5. The method of claim 1 further comprising:
   computing a path to a destination of the air vehicle that maintains the distance margin from the neighboring air vehicle.

6. The method of claim 1 wherein the distance margin comprises a lateral distance margin and a vertical distance margin.

7. The method of claim 1 further comprising:
   determining a combined required navigation performance (CRNP) value responsive to the air vehicle being within an predefined airspace; and
   responsive to determining the CRNP value, setting the distance margin to a multiple of the CRNP value.

8. The method of claim 7 wherein determining the CRNP value comprises determining a lateral CRNP value and a vertical CRNP value.

9. The method of claim 8 wherein at least one of the lateral CRNP value and the vertical CRNP value is a dynamic required distance margin.

10. The method of claim 1 further comprising:
    displaying an indication of the CANP value for the neighboring air vehicle by the representation of the neighboring air vehicle.

11. The method of claim 1 wherein displaying the representation of the air vehicle and the representation of the neighboring air vehicle on the display comprises:
    dynamically displaying a lateral two-dimensional display of the representation of the neighboring air vehicle with the representation of the air vehicle displayed in a middle of the lateral two-dimensional display responsive to the lateral two-dimensional display being selected and displaying an indication of the CANP value by the representation of the neighboring air vehicle;

dynamically displaying a vertical two-dimensional display of the representation of the neighboring air vehicle with the representation of the air vehicle displayed in a middle of the vertical two-dimensional display responsive to the vertical two-dimensional display being selected and displaying an indication of the CANP value by the representation of the neighboring air vehicle; and dynamically displaying a three-dimensional display of the representation of the neighboring air vehicle with the representation of the air vehicle displayed in a middle of the three-dimensional display responsive to the three-dimensional display being selected and displaying an indication of the CANP value by the representation of the neighboring air vehicle.

12. The method of claim 11 further comprising displaying an indication of a combined required navigation performance (CRNP) value on the display.

13. A navigation device of an air vehicle comprising:
a wireless interface;
a processor in communication with the wireless interface; and
a memory comprising instructions, that when executed by the processor cause the processor to perform operations comprising:
receiving a position of a neighboring air vehicle and an actual navigation performance (ANP) value of the neighboring air vehicle from the neighboring air vehicle using the wireless interface;
displaying a representation of the air vehicle and a representation of the neighboring air vehicle on a display;
determining a combined ANP (CANP) value based on the ANP value from the neighboring air vehicle and an ANP value of the air vehicle;
comparing a position of the air vehicle to the CANP value; and
responsive to the position of the air vehicle being within a distance margin away from the neighboring air vehicle based on the CANP value, performing an action to increase a distance the air vehicle is from the neighboring air vehicle.

14. The navigation device of claim 13, wherein performing the action comprises requiring one of the air vehicle or the neighboring air vehicle to move away from the other of the air vehicle or the neighboring air vehicle.

15. The navigation device of claim 13 wherein determining the CANP value comprises calculating $$CANP_l = \sqrt{ANP_l^2 + ANP_{l1}^2}$$

and $$CANP_h = \sqrt{ANP_h^2 + ANP_{h1}^2}$$

where $CANP_l$ is a CANP value in a lateral direction, $ANP_l$ is an ANP value of the air vehicle in the lateral direction, $ANP_{l1}$ is an ANP value of the neighboring air vehicle in the lateral direction, $CANP_h$ is a CANP value in a vertical direction, $ANP_h$ is an ANP value of the air vehicle in the vertical direction, and $ANP_{h1}$ is an ANP value of the neighboring air vehicle in the vertical direction.

16. The navigation device of claim 13 further comprising:
determining a combined required navigation performance (CRNP) value responsive to the air vehicle being within an predefined airspace; and
responsive to determining the CRNP value, setting the distance margin to the CRNP value.

17. The navigation device of claim 16 wherein determining the CRNP value comprises determining a lateral CRNP value and a vertical CRNP value.

18. The navigation device of claim 17 wherein at least one of the lateral CRNP value and the vertical CRNP value is a dynamic required distance margin.

19. The navigation device of claim 13 wherein displaying the representation of the air vehicle and the representation of the neighboring air vehicle on the display comprises:
dynamically displaying a lateral two-dimensional display of the representation of the neighboring air vehicle with the representation of the air vehicle displayed in a middle of the lateral two-dimensional display responsive to the lateral two-dimensional display being selected and displaying an indication of the CANP value by the representation of the neighboring air vehicle and displaying an indication of a lateral combined required navigation performance (CRNP) value on the display;
dynamically displaying a vertical two-dimensional display of the representation of the neighboring air vehicle with the representation of the air vehicle displayed in a middle of the vertical two-dimensional display responsive to the vertical two-dimensional display being selected and displaying an indication of the CANP value by the representation of the neighboring air vehicle and displaying an indication of a vertical CRNP value on the display; and
dynamically displaying a three-dimensional display of the representation of the neighboring air vehicle with the representation of the air vehicle displayed in a middle of the three-dimensional display responsive to the three-dimensional display being selected and displaying an indication of the CANP value by the representation of the neighboring air vehicle and displaying an indication of a lateral CRNP value and the vertical CRNP value on the display.

20. A non-transitory computer readable medium including program code to be executed by processing circuitry of a navigation device of an air vehicle, whereby execution of the program code causes the processing circuitry to perform operations comprising:
receiving a position of a neighboring air vehicle and an actual navigation performance (ANP) value of the neighboring air vehicle from the neighboring air vehicle;
displaying a representation of the air vehicle and a representation of the neighboring air vehicle on a display;
determining a combined ANP (CANP) value based on the ANP value from the neighboring air vehicle and an ANP value of the air vehicle;
comparing a position of the air vehicle to the CANP value; and
responsive to the position of the air vehicle being within a distance margin away from the neighboring air vehicle based on the CANP value, performing an action to increase a distance the air vehicle is from the neighboring air vehicle.

* * * * *